United States Patent [19]

Hsu

[11] 4,256,910
[45] Mar. 17, 1981

[54] LIQUID REACTIVE POLYMERS

[75] Inventor: Chin C. Hsu, Avon Lake, Ohio

[73] Assignee: The B. F. Goodrich Company, Akron, Ohio

[21] Appl. No.: 73,161

[22] Filed: Sep. 6, 1979

[51] Int. Cl.$^3$ .............................................. C08G 65/24
[52] U.S. Cl. ................................... 560/209; 528/408; 528/409; 528/419; 528/421; 560/223; 560/224; 525/403
[58] Field of Search ....................... 560/224, 209, 223; 528/408, 409, 419, 421; 525/403

[56] References Cited

U.S. PATENT DOCUMENTS

| | | | |
|---|---|---|---|
| 3,850,856 | 11/1974 | Dreyfuss | 260/2 A |
| 3,850,857 | 11/1974 | Dreyfuss | 260/2 A |
| 3,951,888 | 4/1976 | Isayama et al. | 260/823 |
| 3,993,684 | 11/1976 | Dunnavant et al. | 260/471 R |

*Primary Examiner*—Earl A. Nielsen
*Attorney, Agent, or Firm*—J. Hughes Powell, Jr.

[57] ABSTRACT

Terminally unsaturated liquid epihalohydrin polymers are produced by polymerizing at least one epihalohydrin using hydroxyalkyl acrylate or methacrylates as a modifier. The polymerization is conducted in the presence of a catalytic amount of a trialkyl oxonium salt of an $HMF_6$ acid wherein M is an element selected from the group consisting of phosphorus, arsenic and antimony. The polymers are useful as tougheners for unsaturated polyester resin systems.

19 Claims, No Drawings

LIQUID REACTIVE POLYMERS

BACKGROUND OF THE INVENTION

Copolymerizations of epichlorohydrin with glycidyl esters of ethylenically unsaturated acids or ethylenically unsaturated epoxides to produce solid elastomers which contain vinly unsaturation have been disclosed previously in U.S. Pat. No. 3,285,870 and 3,158,591. The prior art teaches preparation of trialkyl oxonium salts of $HMF_6$ wherein M is an element selected from the group consisting of phosphorus, arsenic and antimony (U.S. Pat. No. 3,585,227) that are useful as catalysts for preparation of rubbery polyepihalohydrins (U.S. Pat. No. 3,850,857); and, when water or a glycol is employed as reactant, liquid hydroxyl-terminated epihalohydrin polymers (U.S. Pat. No. 3,850,856.

SUMMARY OF THE INVENTION

Terminally unsaturated liquid epihalohydrin plymers have the formula

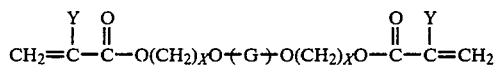

wherein Y is hydrogen or alkyl, X is 2 to 10 and G is a polymeric backbone comprising units of at least one epihalohydrin, optionally together with at least one other epoxide. Polymers are prepared by polymerization of an epihalohydrin in the presence of a catalytic amount of a trialkyl oxonium salt of an $HMF_6$ acid wherein M is an element selected from the group consisting of phosphorous, arsenic and antimony, and in the presence of hydroxyalkyl acrylates or methacrylates. Unsaturated polyester molding compositions containing these terminally unsaturated polymers have improved toughness when suitably cured.

DETAILED DESCRIPTION

This invention discloses vinyl terminated polyepihalohydrins of low molecular weight. The polymers may be used as a toughener for unsaturated polyester resin systems.

The prior art described in U.S. Pat. No. 3,850,856 is a process of manufacturing hydroxyl terminated poly(epichlorohydrins) by cationic polymerization using triethyloxonium hexafluorophosphate (TEOP) as the initiator and in the presence of a controlled amount of water or ethylene glycol.

The invention disclosed herein is a process which differs from the prior art in that the products of this invention are low molecular weight poly(epihalohydrins) which are not only viscous liquids at room temperature but also contain terminal vinyl groups prepared by polymerizing an epihalohydrin in the presence of a trialkyl oxonium slat of a hexafluorometallic acid catalyst and hydroxy alkyl acrylates or methacrylates.

The terminally unsaturated liquid epihalohydrin polymers have the formula

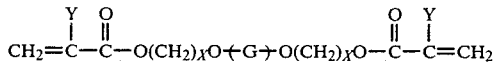

wherein Y is hydrogen or methyl and X is 2 to 10, preferably 2 to 4. G is a polymeric backbone comprising units of at least one epihalohydrin optionally together with at least one other epoxide such as those having the formula

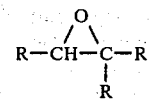

wherein all R radicals are selected from the group consisting of hydrogen, alkyl and alkenyl radicals containing 1 to 10 carbon atoms, more preferably 1 to 5 carbon atoms, alkoxyalkyl radicals containing 2 to 10 carbon atoms more preferably 2 to 6 carbon atoms, phenoxyalkyl radicals wherein the alkyl group contains 1 to 6 carbon atoms, and phenyl radicals, and at least one of said R radicals is hydrogen. Even more preferably all R radicals are selected from the group consisting of hydrogen and alkyl radicals containing 1 to 3 carbon atoms, and at least one of said R radicals is hydrogen. Examples of suitable epoxides include alkylene oxides such as ethylene oxide, propylene oxide, cis-and transbut preferably cis-butene-2-oxide, butene-1-epoxide, cis- and trans-pentene-2-oxide, cis- and trans-hexene-2-oxide, cis- and trans-hexene-3-oxide, and the like; phenyl akylene oxides such as styrene oxide and the like; and glycidyl ethers such as methyl glycidyl ether, ethyl glycidyl ether, methylethyl glycidyl ether, butyl glycidyl ether, phenyl glycidyl ether, and the like. Normally in amounts up to 50 weight percent of the epoxy monomer. Excellent results were obtained with ethylene oxide and propylene oxide. Also, unsaturated glycidyl ethers of the general formula

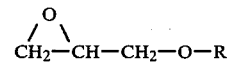

where R is an ethylenically unsaturated radical such as vinyl, allyl, alkenyl and the like. Typical glycidyl ethers include vinyl glycidyl ether, allyl glycidyl ether, butenyl glycidyl ether, 4-vinylcyclohexyl glycidyl ether, abietyl glycidyl ether, cyclohexenylmethyl glycidyl ether, o-allyl-phenyl glycidyl ether is amounts up to 20 weight percent of the epoxy monomers. While the unsaturated glycidyl ethers are generally preferred, useful copolymers may also be made with monoepoxides of dienes or polyenes such as butadiene, methylene monoxide, chloroprene monoxide, 3,4-epoxyl-1-pentene, 4,6-epoxy-2-hexene, 2-epoxy-5, 9-cyclododecadiene, and the like. Alkylene oxides are preferred "other epoxides", with ethylene oxide, propylene oxide glycidyl acrylate and methacrylate and allyl glycidyl ether being especially useful. Prepared epihalohydrins are epichlorohydrin and epibromohydrin, with epichlorohydrin being especially useful.

The terminally unsaturated epihalohydrin liquid polymers of the present invention are prepared using the catalyst described in U.S. Pat. Nos. 3,585,227, 3,850,856 and 3,850,857 but in the substantial absence of water or glycol. The catalyst is a trialkyl oxonium salt of a hexfluorometallic acid, $HMF_6$ wherein M is an element selected from the group consisting of phosphorus, arsenic and antimony, such acids being $HPF_6$, $HAsF_6$, and $HSbF_6$. A particularly economical method of preparing these catalysts is described in the aforementioned U.S. Pat. No. 3,585,227. This process entails mixing a solution of and $HMF_6$ acid with a dialkyl ether and an epoxide selected from the group consisting of alkylene oxides and halogen-substituted alkylene oxides. The ether employed in said process determines the alkyl groups present in the oxonium salt and one will select the ether for this purpose. Suitable dialkyl ethers include dimethyl ether, methyl ethyl ether, diethyl ether, dipropyl ether, ethyl propyl ether, di-n-butyl ether, di-n-amyl ether dihexyl ether, di-2-ethylhexyl ether and the like.

The preferred catalyst for use in the present process is triethyloxonium hexafluorophosphate (TEOP)

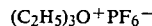

which is easily handled, stable crystalline salt. The amount of catalyst typically will vary from about 0.001 to about 1.0 weight part, for example, 0.02 to 0.1, per 100 weight parts of epoxide monomer being polymerized. The preferred catalyst amount is from about 0.004 to about 0.025 weight part per 100 weight parts of epoxide monomer. Of course, the exact amount of catalyst in any particular polymerization recipe will depend upon the specific $HMF_6$ salt used as well as the mode of polymerization, reaction temperature, and the like.

The vinyl-containing liquid polyepihalohydrins are prepared by the cationic polymerization of epihalohydrins using TEOP as the initiator with controlled amounts of a chain transfer agent selected from hydroxyalkyl acrylates and hydroxyalkyl methacrylates. The amount of chain transfer agent controls the vinyl content, the molecular weight and viscosity of the product. Usually, the amount employed can be in the range of 0.01 to 10 parts in weight based on one hundred parts of monomers employed. The preferred range is 0.01 to 5 parts.

The hydroxy alkyl acrylates and methacrylates have the formula

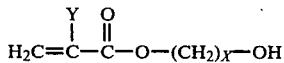

wherein Y is hydrogen or methyl, and X is from 2 to 10, preferably 2 to 4. Typical examples include 2-hydroxy ethyl acrylate, 3-hydroxy propyl acrylate, 3-hydroxy propyl methacrylate, 2-hydroxy ethyl methacrylate, and the like. The actual number of terminal unsaturated groups may vary from about 1 to about 2 per polymer molecule. The amount of hydroxy alkyl acrylate or methacrylate typically will vary from about 0.01 weight part to about 30 weight parts per 100 weight parts of epoxide monomer, more preferably from about 1.0 to about 15 per 100 weight parts of epoxide monomers.

The reaction may be carried out at a reaction temperature of 20° to 100° C., preferably in the range of 30° to 80° C. The initiator, TEOP, which is usually dissolved in methylene chloride may be charged to the reactor with one shot, or incrementally batched in, or preferably, metered in at a constant rate over a span of 1 to 15 hours. The amount of initiator, TEOP, used in the reaction affects the reaction conversion and the yield of product per unit weight of initiator employed.

A typical polymerization technique is as follows. The epoxide monomer(s) and hydroxyalkyl acrylate or hydroxyalkyl methacrylate are charged to a stirred reactor and preheated to about 40° C. to 80° C. (although reaction temperature may vary from about 0° C. to about 110° C.). The catalyst is added neat or as a solution in a solvent such as methylene chloride. The catalyst may be added all at once but is preferably added incrementally or continuously during polymerization to enable better control of reaction rate and temperature. An inert polymerization solvent of diluent is not required but may be useful to promote efficient mixing and temperature control (the reaction is exothermic). Suitable solvents and diluents include benzene, toluene, hexane, cyclohexane, chlorobenzene and carbon tetrachloride. Reaction time normally may be from about 1 to 20 hours or more. Reaction pressure is typically autogeneous, but superatmospheric pressures up to 10 atmospheres or more may be employed with the more volatile monomers and solvents/diluents. The reaction may be shortstopeed at a desired time using a solution of ammonium hydroxide in isopropanol. If a solvent or diluent has been used, the polymer may be recovered by methods known to the art, such as in a thin film evaporator. Any antioxidant such as tetrakis[methylene(3.5-,di-tert-butyl-4-hydroxycinnamate)]methane a stabilizer such as phenothiazine, tert-butyl catechol, and methyl hydroquinone may be added after shortstopping.

The terminally unsaturated epihalohydrin polymers produced by the above method will vary from fluid liquids to thick semi-solids having typical number average molecular weights ($M_n$) from about 100 to about 100,000. The polymers of this invention will typically have Brookfield viscosity ranging from about 10 Pa.S to about 16,000 Pa.S at 27° C.

These characteristic features enable this material to be particularly useful as a toughener for unsaturated polyester resins system because it co-cures with the unsaturated polyester in addition to its easy handling, and has good compatibility with the resin system.

The vinyl terminated polyepihalohydrin of this invention will be particularly useful in the system disclosed and described in U.S. Pat. No. 4,101,604, wherein the molding compositions contain an unsaturated polyester resin, the vinyl terminated polyepihalohydrin of this invention, a polymerizable monomer and optionally, reinforcing fibers, catalyst thermoplastic polymers, thickening agents and fillers as disclosed in said patent. The polymers of this invention also find use in castable compositions used as caulks, sealants and the like, as disclosed in U.S. Pat. No. 3,925,330, wherein the compositions comprise the vinyl terminated polyepihalohydrin of this invention, polymerizable vinyl monomer, and a free radical catalyst system. These materials will also find use in forming co-curing compositions with amine terminated liquid polymers of the nature described in U.S. Pat. No. 4,058,657. Further uses including a particular application of these vinyl terminated polyepihalohydrin will be in the preparation of printing plates described in U.S. Pat. No. 4,137,081, wherein the compositions comprise the vinyl terminated polyepihalohydrin of this invention, at least one ethylenically unsaturated monomer, and a photo initiator.

The following examples illustrate the present invention more fully.

EXAMPLES 1 to 4

A series of experiments was carried out in sealed glass reactors. The procedure called for the initial charging of epichlorohydrin, hydroxy ethyl acrylate or methacrylate, and solvents. The reactors were placed in a tumbler for agitation in a constant temperature bath, set at 50° C. for 20 minutes. The reaction run in the 50° C. bath was kicked-off with the initial injection of 5 ml. of TEOP solution by incremental addition of 1 ml. of TEOP solution on the hour, every hour, for 4 hours. The reaction continued for 1½ hour and was short-stopped with 3 ml. of 1 to 4 mixture in volume ratio of ammonium hydroxide-isopropyl alcohol. The recipe and resultant data are listed in TABLE 1.

TABLE 1.

| VINYL CONTAINING LIQUID POLYEPICHLOROHYDRINS | | | | |
|---|---|---|---|---|
| RUN NO. | 1 | 2 | 3 | 4 |
| Recipe | | | | |
| Epichlorohydrin, grams | 500 | 500 | 500 | 500 |
| HEA, grams[1] | 5 | 15 | 0 | 0 |
| HEMA, grams[2] | 0 | 0 | 5 | 15 |
| TEOP, grams | 0.127 | 0.127 | 0.127 | 0.127 |
| Methylene chloride, ml | 5 | 5 | 5 | 5 |
| Short-Stop Solution, ml | 3 | 3 | 3 | 3 |
| Results | | | | |
| Conversion | 50.1 | 47.6 | 45.2 | 36.9 |
| Product Viscosity | | | | |
| B. Viscosity, pa.S @27° C. | 283.2 | 46.5 | 539.2 | 156.4 |

[1]HEA; 2-hydroxy ethyl acrylate
[2]HEMA; 2-hydroxy ethyl methacrylate

I claim:

1. A terminally unsaturated liquid epihalohydrin polymer having the formula

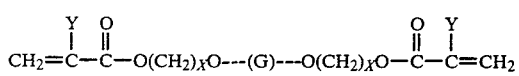

wherein Y is hydrogen or methyl, X is 2 to 10 and G is a polymeric backbone obtained by homopolymerizing an epihalohydrin, copolymerizing two or more epihalohydrins, or copolymerizing an epihalohydrin with a vicinal epoxide.

2. A polymer of claim 1 wherein said epihalohydrin is epichlorohydrin and said polymer has a number average molecular weight from about 100 to about 100,000.

3. A polymer of claim 2 wherein said backbone G also contains copolymerized units of at least one other epoxide having the formula

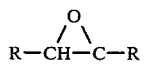

wherein each R is selected from the group consisting of hydrogen, alkyl, alkoxyalkyl and phenyl radicals, but at lest one R is hydrogen.

4. A polymer of claim 3 wherein said other epoxide is an alkylene oxide.

5. A polymer of claim 4 wherein said alkylene oxide is ethylene oxide or a propylene oxide.

6. A polymer of claim 2 wherein said polymer has a number average molecular weight $M_n$ from about 100 to about 100,000.

7. A polymer of claim 2 wherein Y is hydrogen and X is 2 to 4.

8. A polymer of claim 2 wherein Y is methyl and X is 2 to 4.

9. A polymer of claim 2 wherein said backbone G also contain copolymerized units of at least one other epoxide of the formula

wherein R is an ethylenically unsaturated radical.

10. A process for the manufacture of a terminally unsaturated liquid epihalohydrin polymer which comprises polymerizing said epihalohydrin together with a hydroxyalkyl acrylate or methacrylate in the presence of a catalytic amount of a trialkyl oxonium salt of an $HMF_6$ acid wherein M is an element selected from the group consisting of phosphorus, arsenic and antimony, and said polymer has the formula

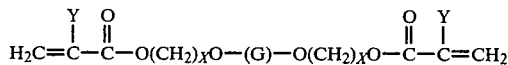

wherein Y is hydrogen or methyl, and G is a polymeric backbone comprising polymerized units of at least one epihalohydrin.

11. A process of claim 10 wherein said epihalohydrin is epichlorohydrin, and said $HMF_6$ acid is $HPF_6$.

12. A process of claim 11 wherein the hydroxyalkyl acrylate is 2-hydroxyl ethyl acrylate or hydroxyl ethyl methacrylate.

13. A process of claim 12 wherein said polymerization is carried out at a temperature in the range of 0° C. to 110° C., and said backbone G also contains polymerized units of at least one other epoxide having the formula

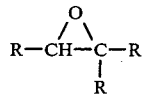

wherein each R is selected from the group consisting of hydrogen, alkyl, alkoxyalkyl, phenyl and unsaturated radicals, but at least one R is hydrogen.

14. A process of claim 13 wherein the trialkyloxonium salt of $HPF_6$ is triethyloxonium hexafluorophosphate.

15. A process of claim 14 wherein said other epoxide is an alkylene oxide.

16. A process of claim 15 wherein said alkylene oxide is ethylene oxide or propylene oxide.

17. A process of claim 16 wherein R is hydrogen.

18. A process of claim 10 wherein said epihalohydrin is epichlorohydrin, and said $HMF_6$ acid is $HAsF_6$.

19. A process of claim 10 wherein said epihalohydrin is epichlorohydrin, and said $HMF_6$ acid is $HSbF_6$.

* * * * *

UNITED STATES PATENT AND TRADEMARK OFFICE
CERTIFICATE OF CORRECTION

PATENT NO. : 4,256,910
DATED : March 17, 1981
INVENTOR(S) : Chin Chien Hsu

It is certified that error appears in the above-identified patent and that said Letters Patent are hereby corrected as shown below:

In claim 3, the formula should read as follows:

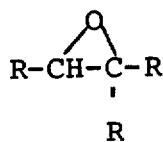

In claim 3, last line, the word "lest" should read "least".

Signed and Sealed this

Eighteenth Day of January 1983

[SEAL]

Attest:

GERALD J. MOSSINGHOFF

Attesting Officer          Commissioner of Patents and Trademarks